US011960766B2

(12) United States Patent
Venugopal et al.

(10) Patent No.: US 11,960,766 B2
(45) Date of Patent: Apr. 16, 2024

(54) DATA STORAGE DEVICE AND METHOD FOR ACCIDENTAL DELETE PROTECTION

(71) Applicant: Western Digital Technologies, Inc., San Jose, CA (US)

(72) Inventors: Abhinandan Venugopal, Bangalore (IN); Amit Sharma, Bengaluru (IN)

(73) Assignee: Western Digital Technologies, Inc., San Jose, CA (US)

(*) Notice: Subject to any disclaimer, the term of this patent is extended or adjusted under 35 U.S.C. 154(b) by 147 days.

(21) Appl. No.: 17/542,795

(22) Filed: Dec. 6, 2021

(65) Prior Publication Data
US 2023/0176780 A1 Jun. 8, 2023

(51) Int. Cl.
*G06F 3/06* (2006.01)
(52) U.S. Cl.
CPC .......... *G06F 3/0659* (2013.01); *G06F 3/0604* (2013.01); *G06F 3/0652* (2013.01); *G06F 3/0679* (2013.01)
(58) Field of Classification Search
CPC .... G06F 3/0659; G06F 3/0604; G06F 3/0652; G06F 3/0679
See application file for complete search history.

(56) References Cited

U.S. PATENT DOCUMENTS

| 9,063,886 | B2 | 6/2015 | Post et al. |
| 9,128,872 | B2 | 9/2015 | Danilak |
| 9,575,682 | B2 | 2/2017 | Kandiraju et al. |
| 9,697,087 | B2 | 7/2017 | Koarashi |
| RE48,448 | E | 2/2021 | Colgrove et al. |
| 2016/0179386 | A1* | 6/2016 | Zhang .................. G06F 3/0679 711/103 |
| 2018/0074891 | A1* | 3/2018 | Yang ...................... G11C 29/52 |
| 2021/0034298 | A1* | 2/2021 | Yoon ..................... G06F 3/0659 |

* cited by examiner

*Primary Examiner* — Masud K Khan
(74) *Attorney, Agent, or Firm* — Crowell & Moring LLP

(57) ABSTRACT

A data storage device and method for accidental delete protection are provided. In one embodiment, a data storage device comprises a memory and a controller. The memory comprises a first set of physical blocks and a second set of physical blocks, where the first and second sets of physical blocks are associated with separate logical-to-physical address tables and/or separate block lists. The controller is configured to write data received from a host in the first set of physical blocks and move the data from the first set of physical blocks to the second set of physical blocks in response to the host requesting that a modified version of the data be written in the memory. Other embodiments are possible, and each of the embodiments can be used alone or together in combination.

15 Claims, 12 Drawing Sheets

DATA STORAGE DEVICE AND METHOD FOR ACCIDENTAL DELETE PROTECTION

BACKGROUND

Despite reliability of modern data storage devices and networks, users can still lose data. For example, when working with files, users may accidentally delete some important data. Such situations are common in professions that handle large amounts of data, such as photography and videography. Various solutions are available for attempting to recover lost data.

DETAILED DESCRIPTION

Overview

Figure 1A:
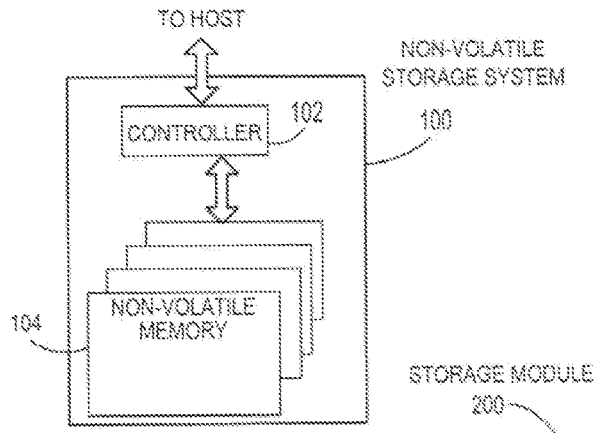
FIG. 1A is a block diagram of a data storage device of an embodiment.

By way of introduction, the below embodiments relate to a data storage device and method for accidental delete protection. In one embodiment, a data storage device is provided comprising a memory and a controller. The memory comprises a first set of physical blocks and a second set of physical blocks. The controller is configured to receive, from a host, a first write command to write data in the memory; write the data in the first set of physical blocks; receive, from the host, a second write command to write a modified version of the data in the memory; move the data from the first set of physical blocks to the second set of physical blocks; and write the modified version of the data in the first set of physical blocks. The first and second sets of physical blocks are associated with separate logical-to-physical address tables and separate block lists.

In some embodiments, the controller is further configured to move the data from the first set of physical blocks to the second set of physical blocks in response to a request from the host.

In some embodiments, the controller is further configured to move the data from the first set of physical blocks to the second set of physical blocks in response to recognizing a priority level associated with the data.

In some embodiments, the controller is further configured to: receive, from the host, a request to restore the data; and in response to receiving the request to restore the data, move the data from the second set of physical blocks to the first set of physical blocks.

In some embodiments, the controller is further configured to: perform a defragmentation operation in the second set of physical blocks after the data has been moved from the second set of physical blocks to the first set of physical blocks.

In some embodiments, the controller is further configured to: in response to receiving the request to restore the data, move the modified data from the first set of physical blocks to the second set of physical blocks.

In some embodiments, the second set of physical blocks comprises a plurality of tiers of physical blocks, each tier comprising different memory characteristics.

In some embodiments, the second set of physical blocks comprises a single-level cell block and a multi-level cell block, and the controller is further configured to select one of the single-level cell block and the multi-level cell block for storage of the data based on a version number of the data.

In some embodiments, the controller is further configured to maintain the data in the second set of physical blocks for a time period associated with a priority level of the data.

In some embodiments, the memory comprises a three-dimensional memory.

In another embodiment, a method is provided that is performed in a data storage device comprising a memory comprising a first set of physical blocks and a second set of physical blocks, wherein the first and second sets of physical blocks are associated with separate logical-to-physical address tables and/or separate block lists. The method comprises writing data received from a host in the first set of physical blocks; and moving the data from the first set of physical blocks to the second set of physical blocks in response to the host requesting that a modified version of the data be written in the memory.

In some embodiments, the data is moved from the first set of physical blocks to the second set of physical blocks in response to a request from the host.

In some embodiments, the data is moved from the first set of physical blocks to the second set of physical blocks based on a priority level associated with the data.

In some embodiments, the method further comprises receiving, from the host, a request to restore the data; and in response to receiving the request to restore the data, moving the data from the second set of physical blocks to the first set of physical blocks.

In some embodiments, the method further comprises performing a defragmentation operation in the second set of physical blocks after the data has been moved from the second set of physical blocks to the first set of physical blocks.

In some embodiments, the method further comprises in response to receiving the request to restore the data, moving the modified data from the first set of physical blocks to the second set of physical blocks.

In some embodiments, the second set of physical blocks comprises a plurality of tiers of physical blocks, each tier comprising different memory characteristics.

In some embodiments, the second set of physical blocks comprise a single-level cell block and a multi-level cell block, and the method further comprises selecting one of the single-level cell block and the multi-level cell block for storage of the data based on a version number of the data.

In some embodiments, the method further comprises maintaining the data in the second set of physical blocks for a time period associated with a priority level of the data.

In another embodiment, a data storage device is provided comprises a memory comprising a first set of physical blocks and a second set of physical blocks, wherein the first and second sets of physical blocks are associated with separate logical-to-physical address tables; means for writing data received from a host in the first set of physical blocks; and means for moving the data from the first set of physical blocks to the second set of physical blocks in response to the host requesting that a modified version of the data be written in the memory.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
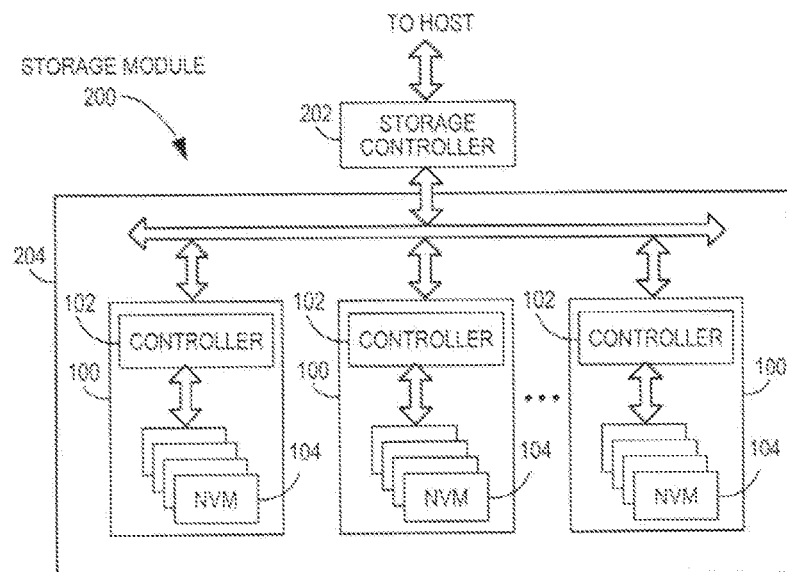
FIG. 1B is a block diagram illustrating a storage module of an embodiment.
Figure 1C:
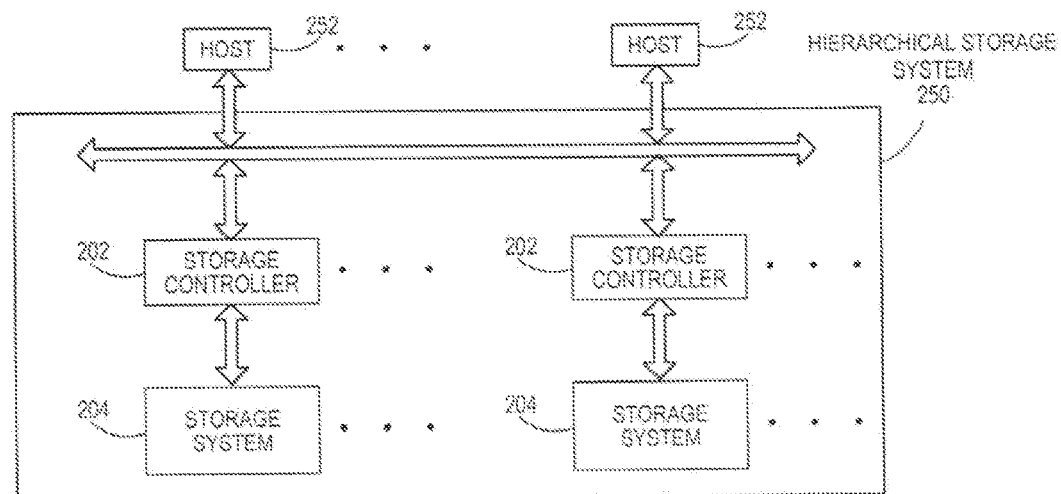
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
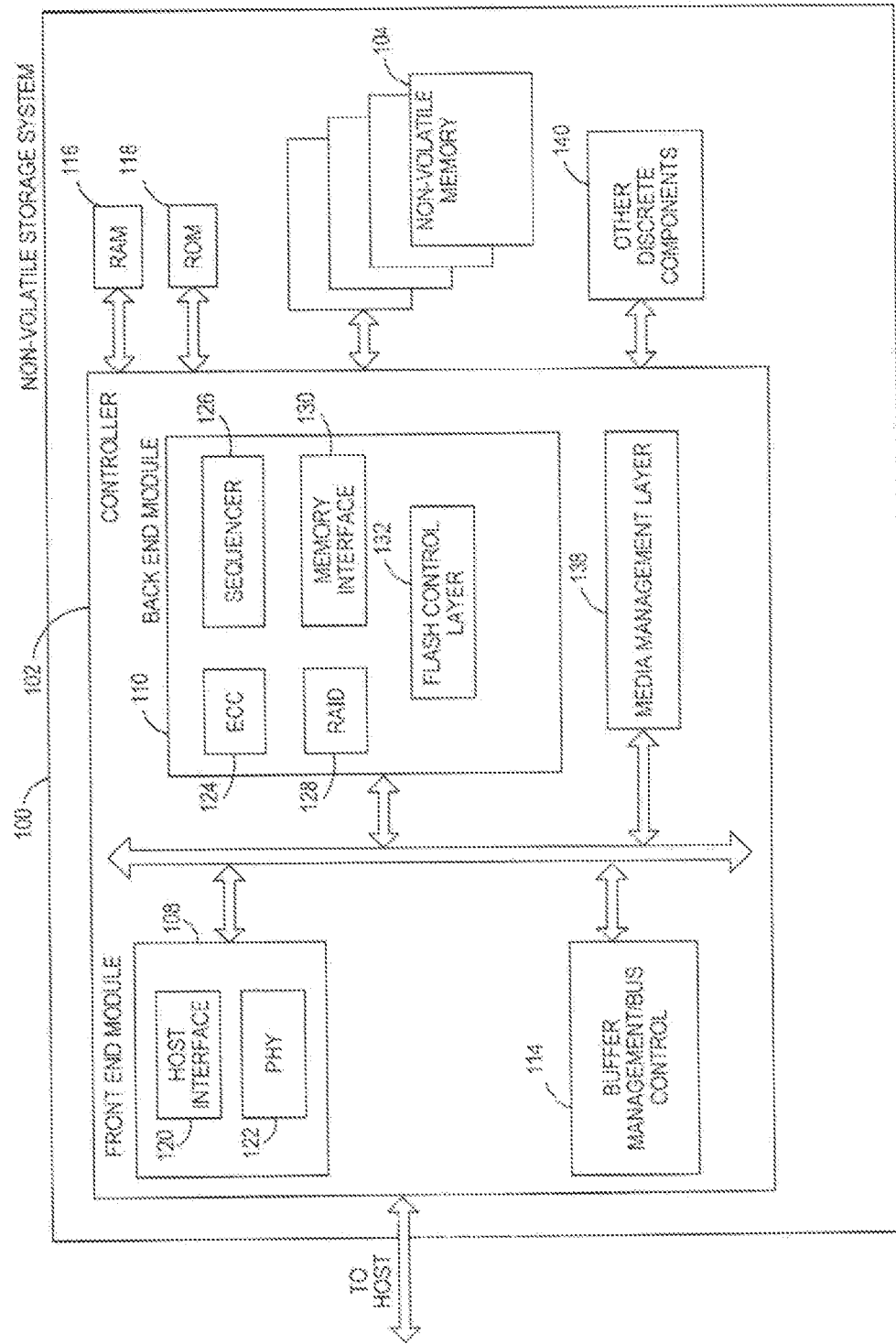
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
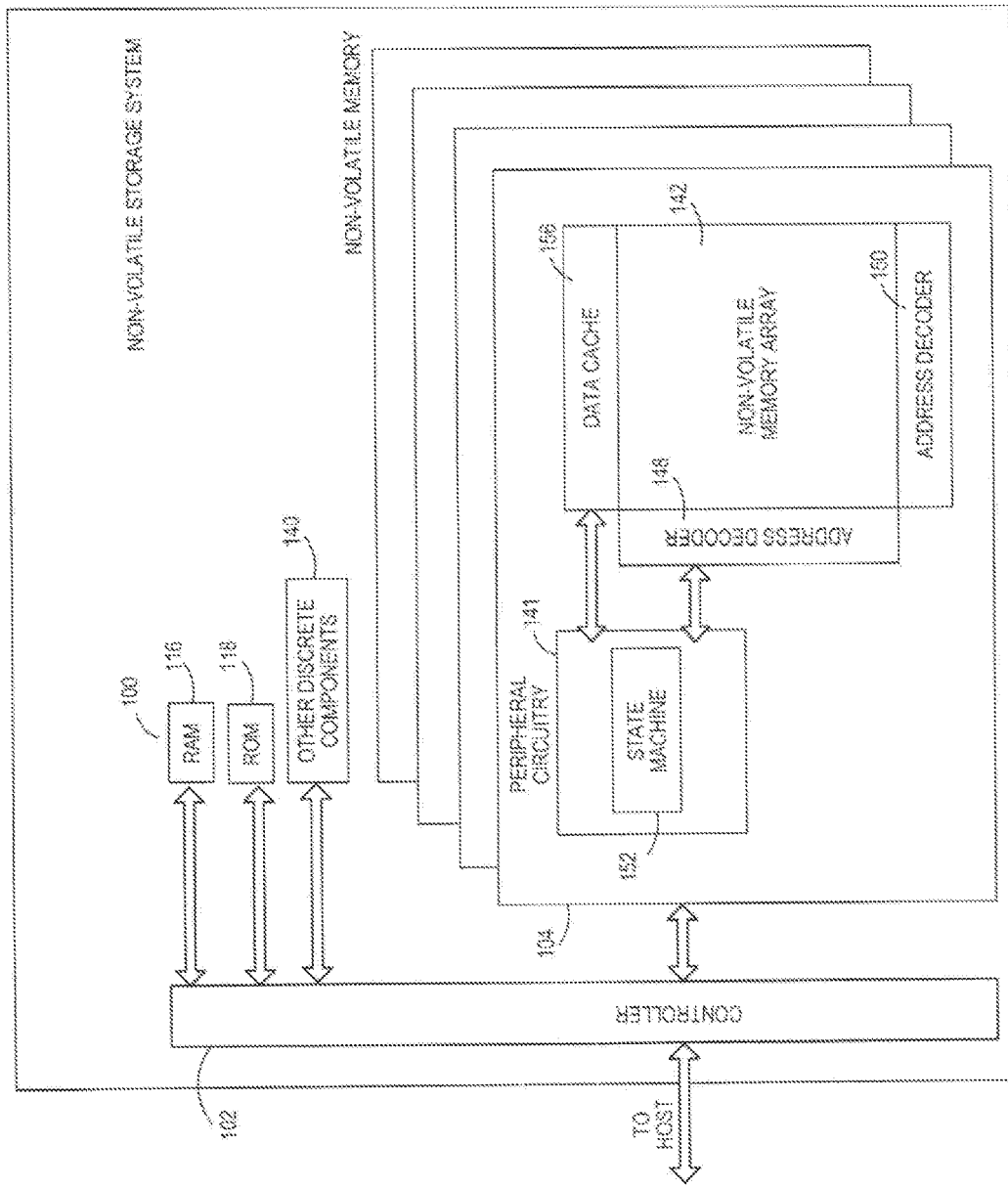
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
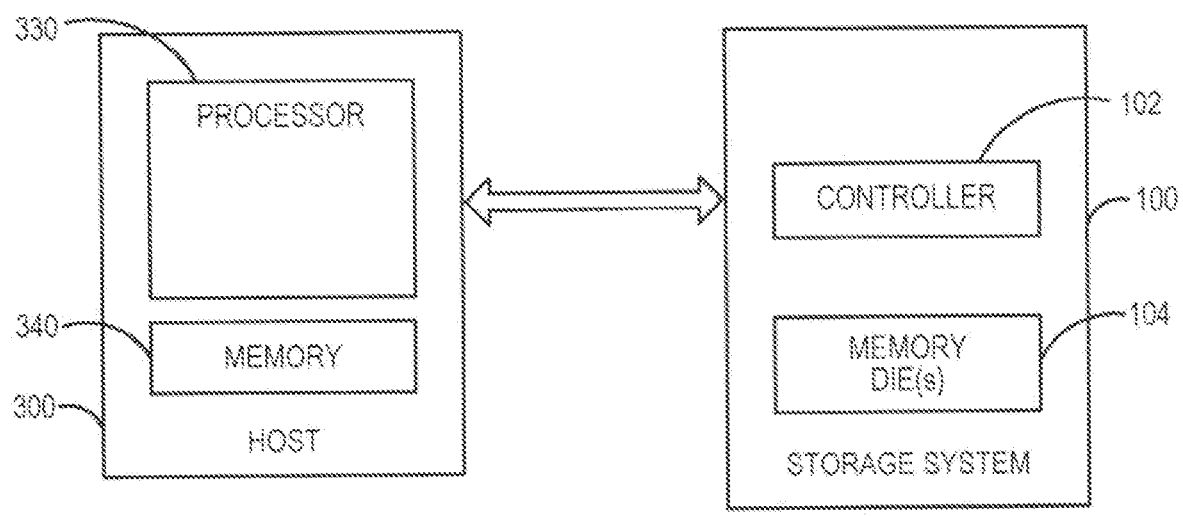
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

Figure 4:
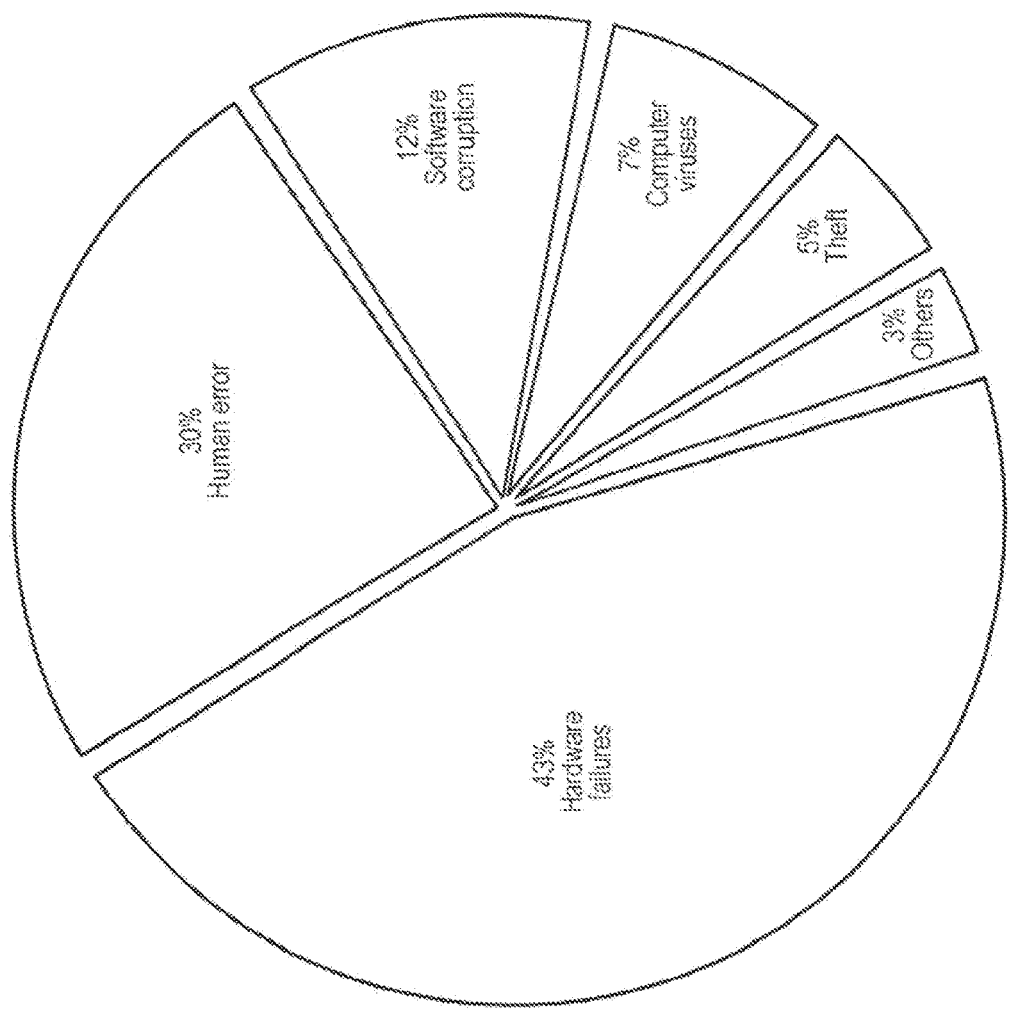
FIG. 4 is a pie chart showing percent ratios of common data loss causes.

As noted above, despite reliability of modern data storage devices and networks, users can still lose data. As shown in the pie chart in FIG. 4, hardware failures (43%) and software corruption/viruses (19%) are sources of data loss that are often outside of the user's control. However, accidental data loss due to user error accounts for 30% of data losses. For example, when working with files, users may accidentally delete some important data. Such situations are common in professions that handle large amounts of data, such as photography and videography. Sometimes, inaccurate attempts to recover the lost information will cause more damage. For example, system repair tools, such as Check Disk (CHKDSK), usually try filling-in the missing information on the disk, causing data overwriting. CHKDSK can also misunderstand the file system problem and do the wrong repair.

"Physical" solutions can be used to prevent lost data. For example, some professional digital cameras are provisioned with dual memory card slots, so the camera can store files to both cards simultaneously, giving a backup should anything happen to one card. Since the camera has to write to two cards at the same time (and one card is often slower), this solution can slow down the speed at which the camera can take multiple photos. This can effectively prevent the camera from being used in some environments, such as sports or wildlife environments, that require multiple photos to be taken quickly in burst mode. So, while the redundancy provided by this solution can protect against data loss due to memory card corruption or hardware failure, it has limitations in terms of data duplication and speed.

Software solutions can be used to recover lost data. Most data storage devices (e.g., SSDs) use flash memory to store data in pages and blocks, referenced by logical block addresses (LBAs) that are managed by a flash translation layer (FTL). When the FTL modifies a sector, it writes the new data to another location and updates the logical-to-physical (L2P) address map (table), so the new data appears at the target LBA. This leaves the pre-modified data in place, with possibly many generations, which is recoverable by data recovery software. Software recovery involves tracing the blocks that have been used previously for L2P tables and backtracking the possible presence of data. However, if a large amount of data is written to the data storage device after an accidental delete but before recovery or if large L2P entries are generated as part of FTL compaction and garbage collection, the required data/entries may already be overwritten or cleared. In such cases, data recovery would not be possible.

Another software solution is to use file versioning with periodic back-ups. A typical digital ecosystem involves data/file workflows. Workflows are characterized with files accessed by multiple people, and, in many cases, files are accessed by multiple users at same time. To provide a streamlined collaborative and cohesive environment, organizations can resort to file versioning systems and back-up information regularly in the cloud or on-premise. For instance, if a user/organization experiences widespread data loss, programs that handle file management and back-up information regularly can quickly restore lost information. Such programs also address concerns about security issues, such as malware, ransomware, and intrusion.

As another example of a software recovery solution, every time file versioning applications hit a timed checkpoint, versions of files are stored to the cloud or to on-site storage facilities. As time-driven file versioning can result in large amounts of data, it is possible to restrict the number of changes or versions that can be made per a specific time duration. Also, users may be limited to access these stored versions for a set period. Some services access every iteration of a stored file, while others only do so for a limited time. An example of the later is the "soft delete" feature of Microsoft's Azure Backup. With soft delete, even if a malicious actor deletes a backup (or backup data is accidentally deleted), the backup data is retained for 14 additional days, allowing the recovery of that backup item with no data loss. However, this is an application-based solution.

The following embodiments can be used to prevent data loss while avoiding the host and protocol complexities involved with large data duplication. In general, these embodiments take advantage of the fact that some data is more important to users than other data. In operation, the data storage device 100 is configured to provide accidental-delete protection for data, and the host 300 provides a hint to the data storage device 100 as to which data needs to be protected. That way, instead of duplicating all data provided by the host 300, the data storage device 100 duplicates only the data that the host 300 deems important enough to protect.

The following paragraphs provide examples of a data-storage-device-intrinsic solution for versioning and data backup by effectively utilizing memory (e.g., NAND) properties. In one example, the host 300 provides a hint/attribute on data that is suitable for enhanced accidental delete protection (EADP). The controller 102 in the data storage device 100 is configured to manage a separate set of physical blocks/namespace/zones for EADP data. The controller 102 in the data storage device 100 can be configured with different data route and management policies for EADP data, and the host 300 can request (hint) an EADP data release, which would result in defragmentation/relocation of data covered by EADP. It should be noted that these are merely examples and other implementations can be used.

Figure 5:
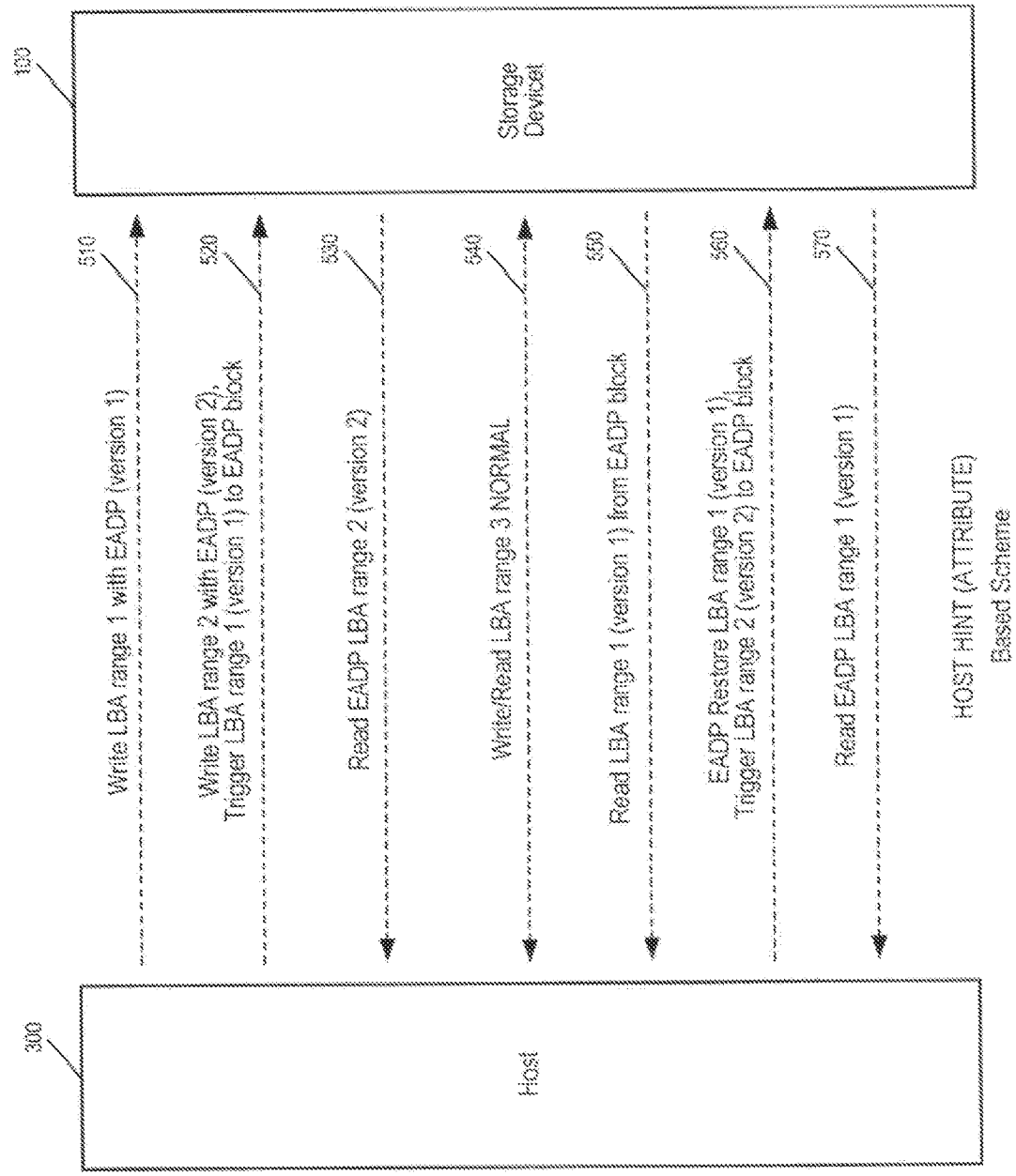
FIG. 5 is a flow diagram of a host hint-based method of an embodiment.

As mentioned above, in this embodiment, the host 300 passes a hint (with attributes (e.g., data version)) that an incoming write command data range needs EADP with versions. This process is illustrated in FIG. 5. As shown in FIG. 5, the host 300 writes LBA range 1 (version 1) with a hint that this range requires EADP (act 510). (Instead of requesting EADP upon initial write, EADP can be requested when a subsequent write of modified data is made.) Next, the host 300 writes LBA range 2 (version 2). Along with this, the host 300 hints that LBA range 1 is the previous version of LBA range 2 and requests that the data in LBA range 1 be moved to an EADP block (act 520). (Other types of hints/requests can be used.) When the host 300 reads the data from LBA range 2, the read data will be the latest version (version 2) (i.e., from LBA range 2) (act 530). After this, the host 300 can read/write LBA range 3 without EADP (act 540). However, if the host 300 wants to access the earlier version (version 1) of the data, the host 300 can request a read of LBA range 1 by providing a hint with the appropriate attributes (act 550). Further, the host 300, using a restore-specific-version attribute, can restore version 1 from LBA range 1 as the latest data by moving the data from the EADP block to the normal set of blocks in the memory 104 (act 560). That way, when the host 300 reads the data, it will read version 1 from LBA range 1 (act 570).

It should be noted that the EADP scheme is also applicable for a multi-host system where data can be accessed by multiple hosts. In such an ecosystem, each host can be defined with access levels and data routing schemes. Also, EADP data can be priority based. For example, Level 0 can mean always reserve, Level 1 can mean only N versions are backed-up in the EADP blocks (guaranteed), and Level 2 can mean only the latest LBA range is guaranteed. Additionally or alternatively, the EADP data can be time based. For example, Level 0 can mean always reserve, Level 1 can mean that data is held for a limited time duration N, and Level 2 can mean immediate release of older versions. Based on such levels, the controller 102 can use takes different schemes for data routing, compaction, and relocation.

In another embodiment, the controller 102 in the data storage device 100 manages separate sets of physical blocks/namespace/zones for EADP. Such sets of blocks are characterized by a separate L2P table and/or a separate EADP block list from the set of physical blocks used for normal read/write operations. Having a separate L2P table avoids the problem noted above in prior solutions where accidentally-deleted data is unable to be restored because older L2P entries that point to the data are deleted as part of FTL compaction and garbage collection operations.

Figure 6:
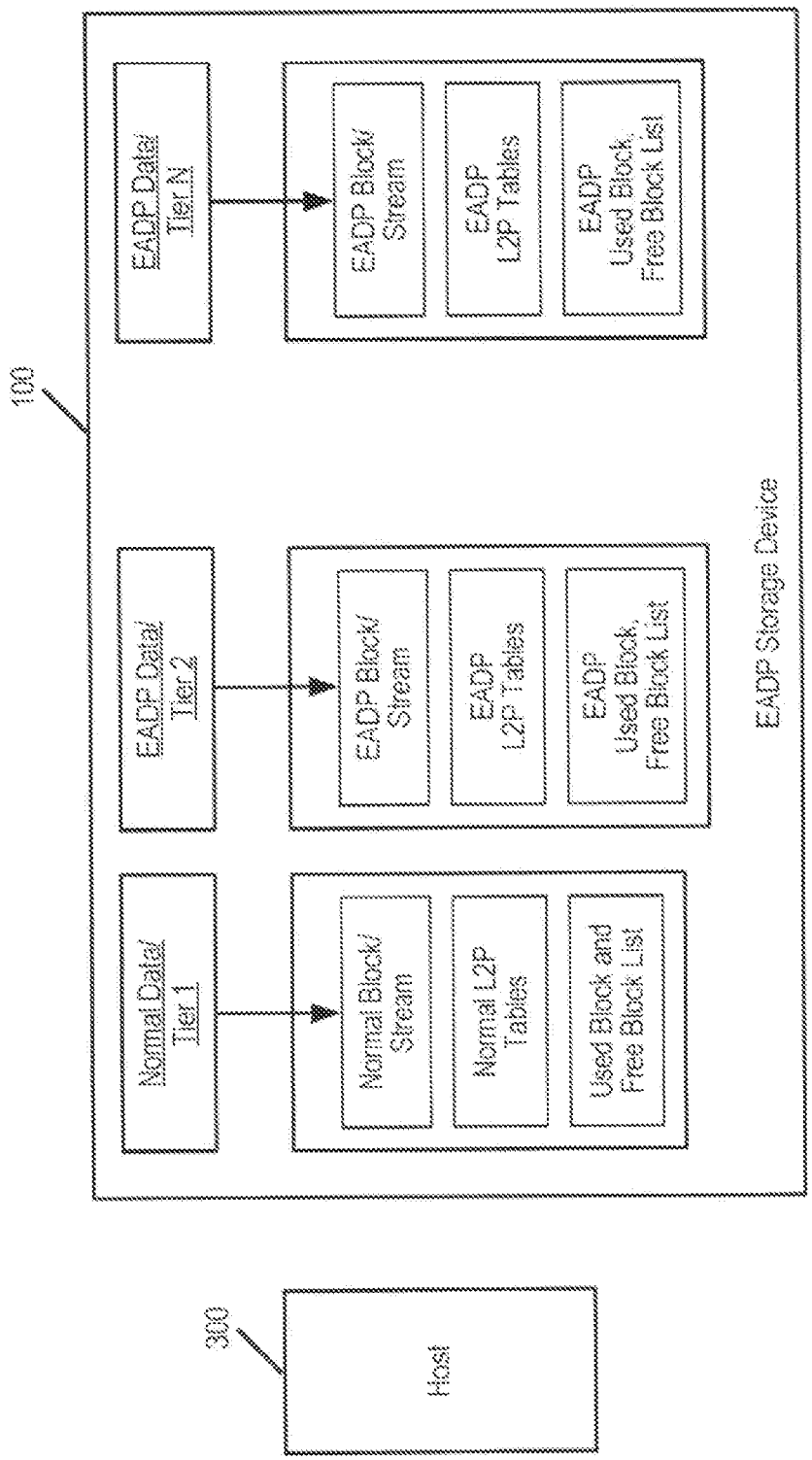
FIG. 6 is a block diagram of a host and data storage device of an embodiment.
Figure 7B:
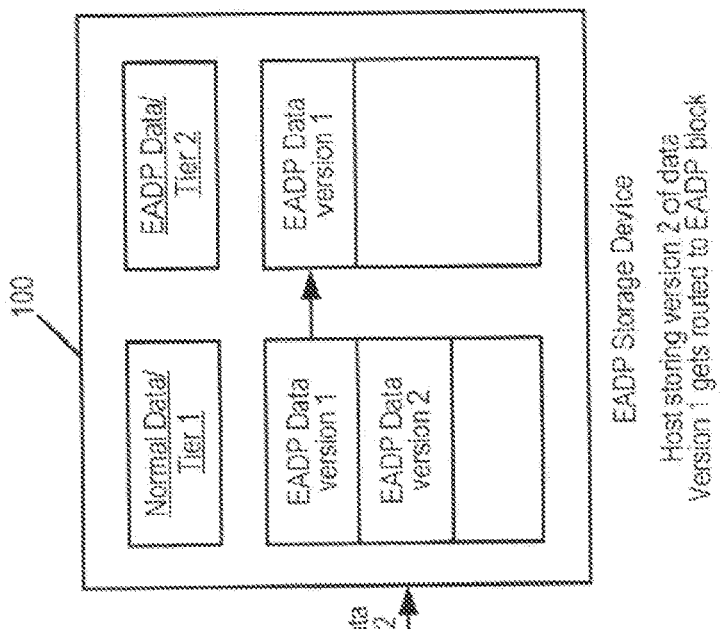
FIG. 7B is a block diagram of a host and data storage device of an embodiment where the host stores version 2 of data.
Figure 7A:
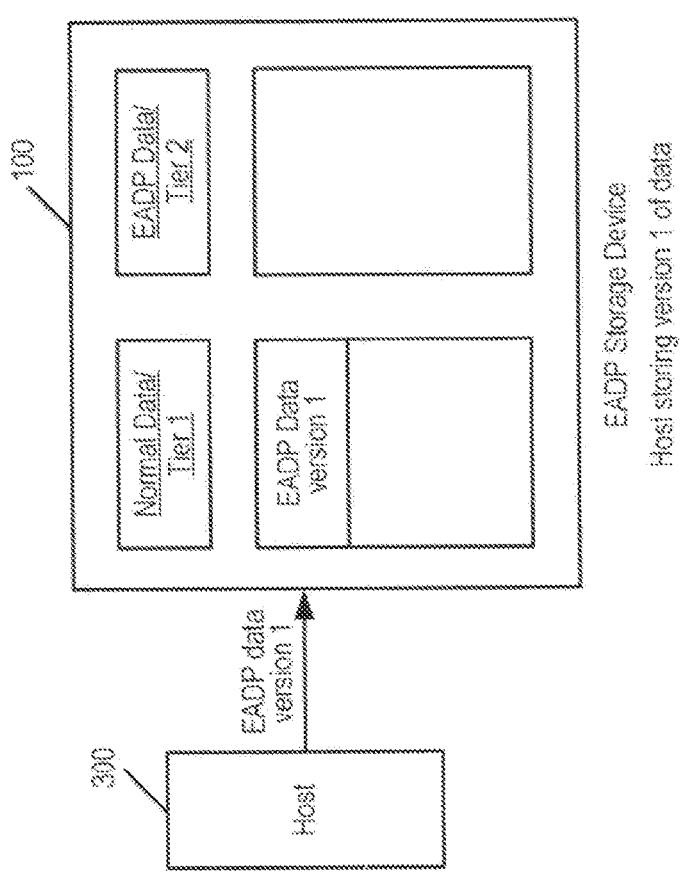
FIG. 7A is a block diagram of a host and data storage device of an embodiment where the host stores version 1 of data.

Further, as shown in FIG. 6, the second set of physical blocks can be formed from different tiers of physical blocks, with each tier having varying memory characteristics, such as endurance and data retention policies, and its own L2P tables and used/free block lists. As shown in FIG. 6, the data storage device 100 of this embodiment comprises Tiers 1-N. Tier 1 is for normal data, and Tiers 2-N are for EADP data. The EADP data routing policy can be based on a host hint. For example, on a host hint, the controller 102 can route the incoming new data from the host 300 into regular blocks in the memory 104 (Tier 1), while routing the previous version of the same data from the regular blocks in Tier 1 to EADP blocks in the memory 104 in Tiers 2-N. FIG. 7A shows the situation in which the host 300 stores version 1 of the data, and FIG. 7B shows the situation in which the host 300 later stores version 2 of the data, which triggers version 1 being moved from Tier 1 (a first set of physical blocks) to Tier 2 (a second set of physical blocks).

Figure 8B:
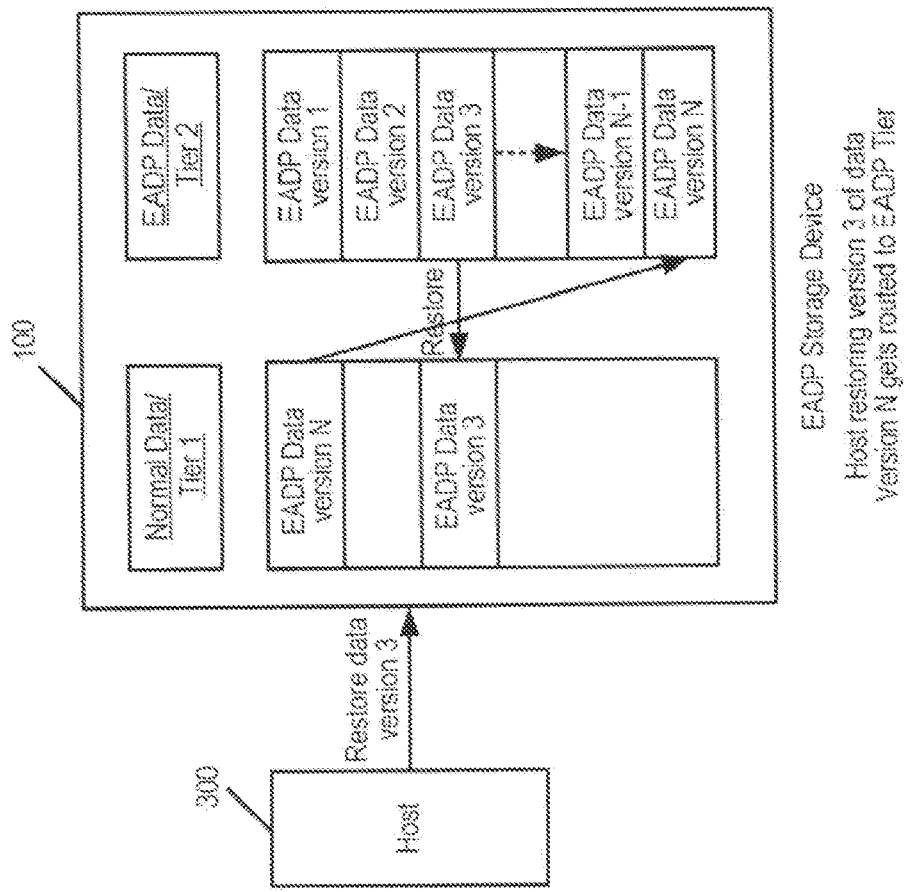
FIG. 8B is a block diagram of a host and data storage device of an embodiment where the host restores version 3 of data.
Figure 8A:
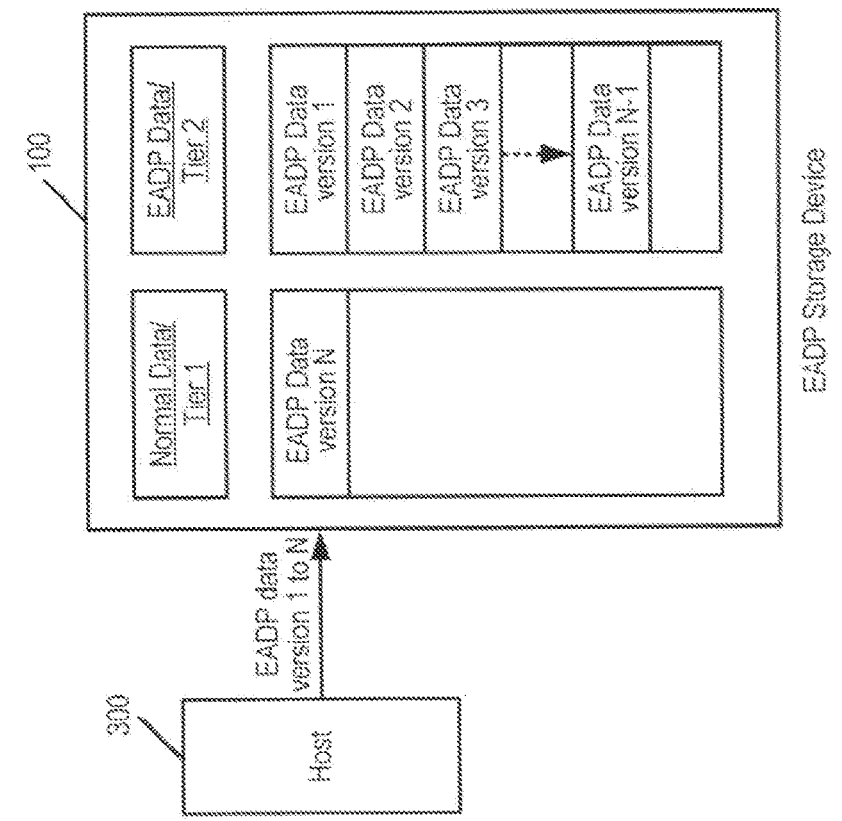
FIG. 8A is a block diagram of a host and data storage device of an embodiment where the host stores N versions of data.
Figure 9:
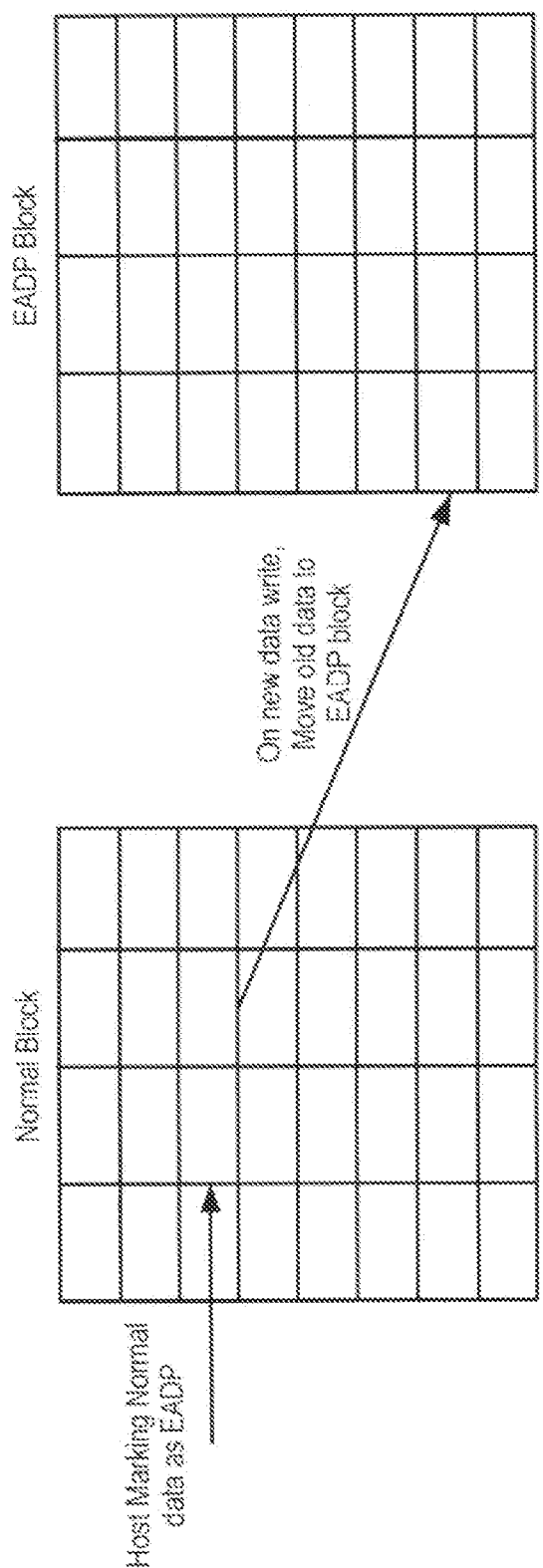
FIG. 9 is an illustration of a translation between blocks of an embodiment.

The host 300 can choose to bring an older version of data from an EADP block to a normal block using hints of which older version of data is to be brought back. This can involve the latest version being routed to the EADP and restoring the host-specified version. This is shown in FIG. 8A (where the host 300 stores N versions of the data) and FIG. 8B (where the host 300 restores version 3 of the data). The host 300 can also choose to apply EADP to already-existing data that was written in normal mode. This enables versioning of that data, and any further updates will trigger the EADP data routing policy. This is shown in FIG. 9. As above, the host 300 can choose to remove the EADP requirement for this data, which will trigger data release from an EADP block.

Figure 10:
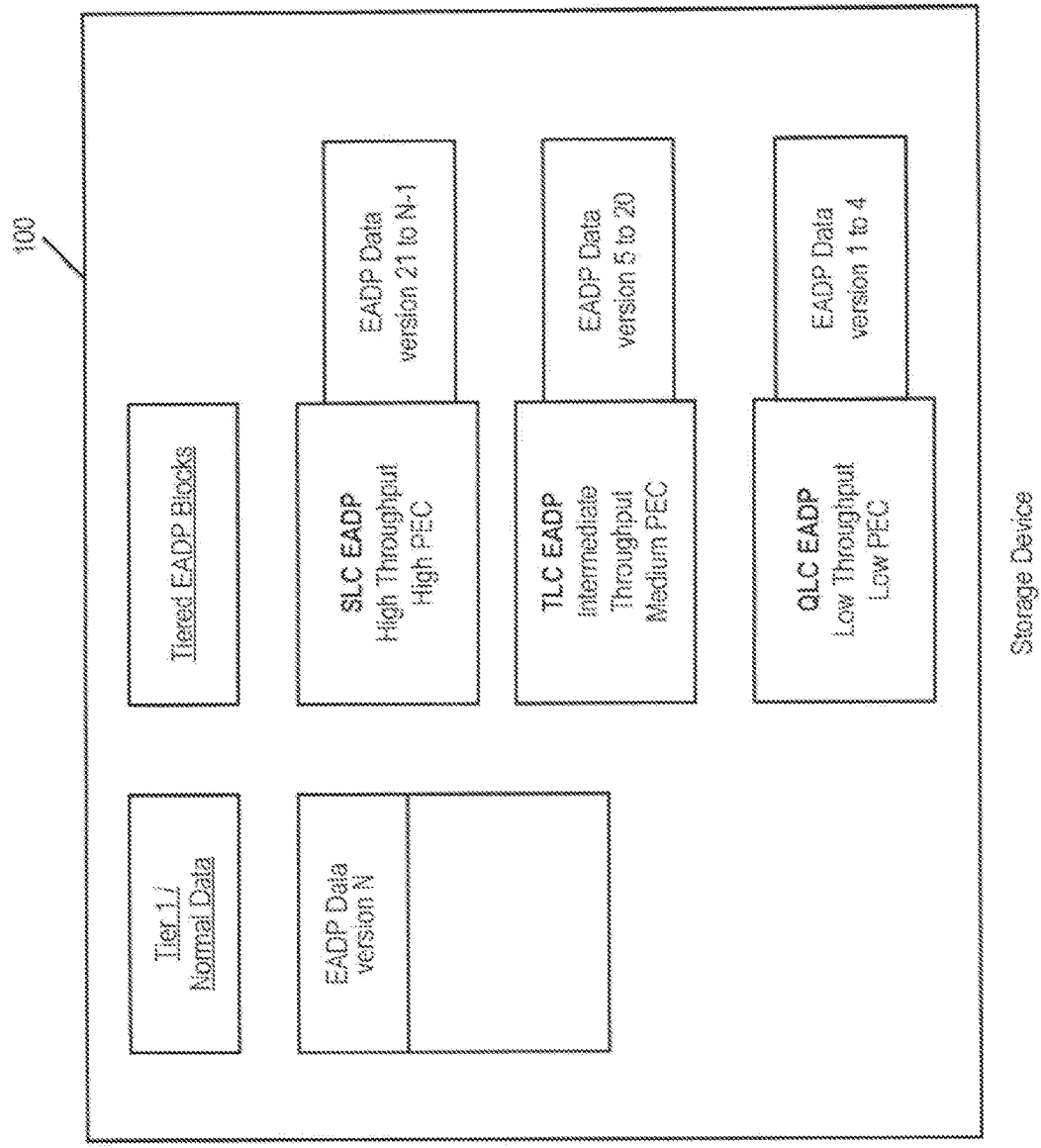
FIG. 10 is a block diagram of a data storage device of an embodiment.

Also, as shown in FIG. 10, EADP blocks/tiers can be formed by utilizing multi-cell-type storage device blocks (e.g., single-level cell (SLC) blocks, triple-level cell (TLC) blocks, and quad-level cells (QLC) blocks). For example, protected/back-up data can be routed to EADP QLC blocks as QLC blocks supports high data/cell density with less program-erase cycles (PEC), while TLC blocks can be used for normal blocks with more program-erase cycles (PEC). As another example, on the set of data that the host 300 requires longer retention time, EADP data can be routed to QLC blocks with less PEC. On data that requires intermediate retention time, EADP routing policy can be changed to TLC blocks, which supports more PEC cycles. For data that requires temporary EADP, data can be held within SLC blocks.

Figure 11:
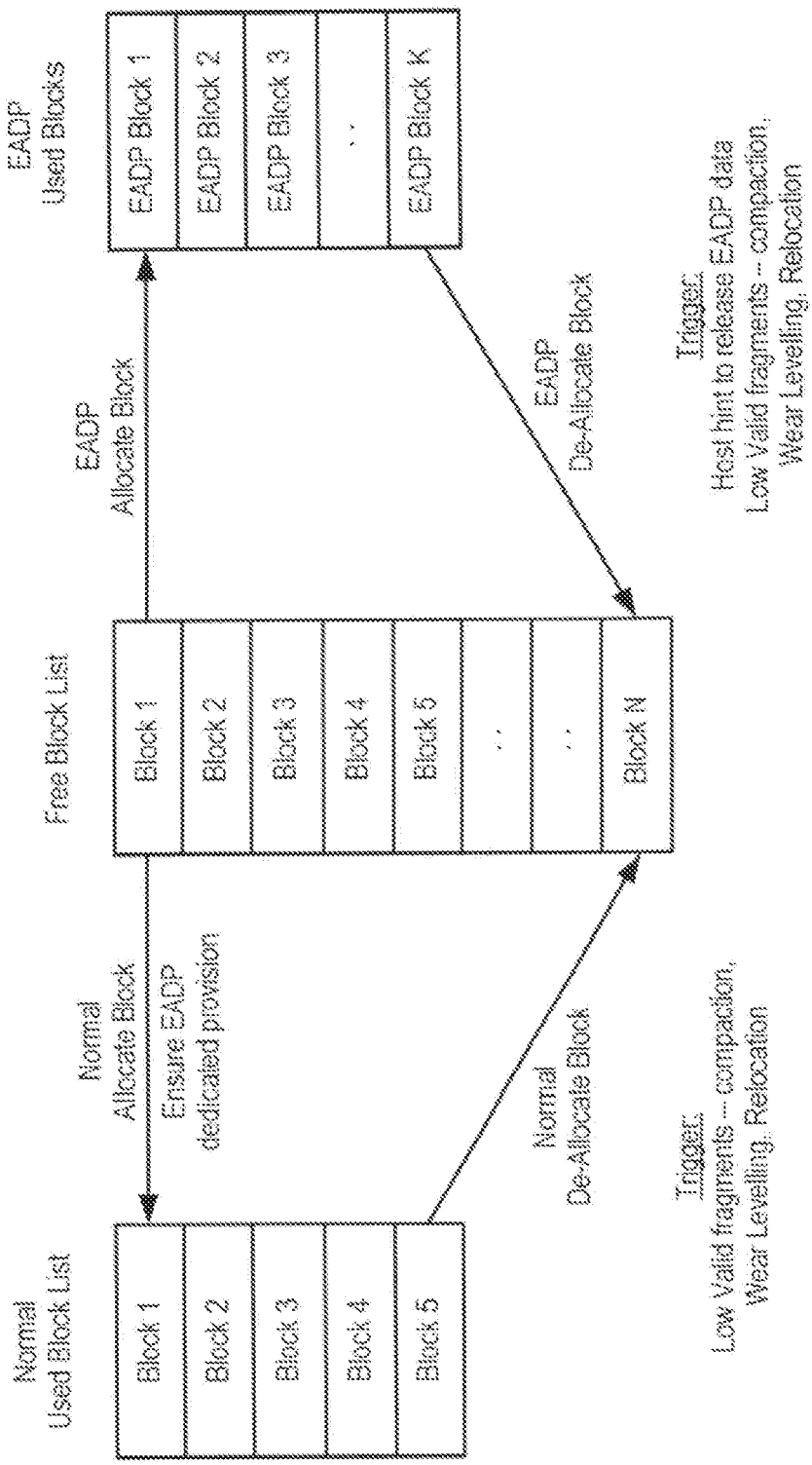
FIG. 11 is an illustration of a free block list of an embodiment.

As mentioned above, the host 300 can provide the data storage device 100 with a hint for EADP data release. With regular flash management, blocks/namespace/zones in the free block list (FBL) are erased in a first-in, first-out (FIFO) fashion, and data is routed into such block(s). After the block is released, the block is added to the FBL. With the EADP scheme, a separate block list can be managed for EADP data. The host 300 can also hint to release the EADP data, which can trigger an unlocking mechanism in the controller 102 for defragmentation/relocation. This is shown in FIG. 11.

There are several advantages associated with these embodiments. For example, these embodiments can be used to increase the lifetime of the data storage device 100. With enhanced usage of cloud services, security issues, such as malware, ransomware, and intrusion, are increasing. With these embodiments, the data storage device 100 can manage backup deletion/retention or accidental deletion intrinsically utilizing device properties, such as, for example, block type usage, data routing, defragmentation/relocation, and erase policies. Such storage device-driven schemes are more efficient than application-managed schemes leading to increased device lifetime. As another advantage, using the EADP scheme on retail storage devices (e.g., SD, USB, and SSD memory devices) can increase the data reliability by providing a way for the host 300 to demark a critical data section from regular data.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
  a memory comprising a first set of physical blocks and a second set of physical blocks wherein:
    the first and second sets of physical blocks are associated with separate logical-to-physical address tables and separate block lists; and
    the second set of physical blocks is configured for storing data protected against accidental deletion; and
  a controller configured to:
    receive, from a host, a first write command to write data in the memory;
    write the data in the first set of physical blocks;
    receive, from the host, a second write command to write a modified version of the data in the memory;
    move the data from the first set of physical blocks to the second set of physical blocks to protect the data from accidental deletion;
    write the modified version of the data in the first set of physical blocks;
    receive, from the host, a request to restore the data, which was accidentally deleted by the modified version of the data; and in response to receiving the request to restore the data, move the data from the second set of physical blocks to the first set of physical blocks.

2. The data storage device of claim 1, wherein the controller is further configured to move the data from the first set of physical blocks to the second set of physical blocks in response to a request from the host.

3. The data storage device of claim 1, wherein the controller is further configured to move the data from the first set of physical blocks to the second set of physical blocks in response to recognizing a priority level associated with the data.

4. The data storage device of claim 1, wherein the controller is further configured to:
perform a defragmentation operation in the second set of physical blocks after the data has been moved from the second set of physical blocks to the first set of physical blocks.

5. The data storage device of claim 1, wherein the second set of physical blocks comprises a plurality of tiers of physical blocks, each tier comprising different memory characteristics.

6. The data storage device of claim 1, wherein:
the second set of physical blocks comprises a single-level cell block and a multi-level cell block; and
the controller is further configured to select one of the single-level cell block and the multi-level cell block for storage of the data based on a version number of the data.

7. The data storage device of claim 1, wherein the controller is further configured to:
maintain the data in the second set of physical blocks for a time period associated with a priority level of the data.

8. The data storage device of claim 1, wherein the memory comprises a three-dimensional memory.

9. A method comprising:
performing the following in a data storage device comprising a memory comprising a first set of physical blocks and a second set of physical blocks, wherein the second set of physical blocks is configured for storing data protected against accidental deletion and the first and second sets of physical blocks are associated with separate logical-to-physical address tables and/or separate block lists:
writing data received from a host in the first set of physical blocks;
moving the data from the first set of physical blocks to the second set of physical blocks to protect the data from accidental deletion in response to the host requesting that a modified version of the data be written in the memory;
receiving, from the host, a request to restore the data; and
in response to receiving the request to restore the data, moving the data from the second set of physical blocks to the first set of physical blocks.

10. The method of claim 9, wherein the data is moved from the first set of physical blocks to the second set of physical blocks based on a priority level associated with the data.

11. The method of claim 9, further comprising:
performing a defragmentation operation in the second set of physical blocks after the data has been moved from the second set of physical blocks to the first set of physical blocks.

12. The method of claim 9, wherein the second set of physical blocks comprises a plurality of tiers of physical blocks, each tier comprising different memory characteristics.

13. The method of claim 9, wherein:
the second set of physical blocks comprises a single-level cell block and a multi-level cell block; and
the method further comprises selecting one of the single-level cell block and the multi-level cell block for storage of the data based on a version number of the data.

14. The method of claim 9, further comprising:
maintaining the data in the second set of physical blocks for a time period associated with a priority level of the data.

15. A data storage device comprising:
a memory comprising a first set of physical blocks and a second set of physical blocks, wherein the second set of physical blocks is configured for storing data protected against accidental deletion and the first and second sets of physical blocks are associated with separate logical-to-physical address tables;
means for writing data received from a host in the first set of physical blocks;
means for moving the data from the first set of physical blocks to the second set of physical blocks to protect the data from accidental deletion in response to the host requesting that a modified version of the data be written in the memory;
means for receiving, from the host, a request to restore the data, which was accidentally deleted by the modified version of the data; and
means for moving the data from the second set of physical blocks to the first set of physical blocks in response to receiving the request to restore the data.

* * * * *